US009608822B2

United States Patent
Lochmatter et al.

(10) Patent No.: US 9,608,822 B2
(45) Date of Patent: Mar. 28, 2017

(54) METHOD FOR GENERATING AN HTML DOCUMENT THAT CONTAINS ENCRYPTED FILES AND THE CODE NECESSARY FOR DECRYPTING THEM WHEN A VALID PASSPHRASE IS PROVIDED

(71) Applicant: Ecole Polytechnique Federale de Lausanne (EPFL), Lausanne (CH)

(72) Inventors: Thomas Lochmatter, Ecublens (CH); Radhakrishna Shri Venkata Achanta, St. Sulpice VD (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 5 days.

(21) Appl. No.: 14/659,080

(22) Filed: Mar. 16, 2015

(65) Prior Publication Data

US 2015/0270974 A1   Sep. 24, 2015

Related U.S. Application Data

(60) Provisional application No. 61/954,625, filed on Mar. 18, 2014.

(51) Int. Cl.
*H04L 29/00* (2006.01)
*H04L 9/32* (2006.01)
*H04L 9/08* (2006.01)

(52) U.S. Cl.
CPC .......... *H04L 9/3236* (2013.01); *H04L 9/0863* (2013.01)

(58) Field of Classification Search
CPC ... H04L 9/3242; H04L 9/3226; H04L 9/3236; H04L 9/0863
See application file for complete search history.

(56) References Cited

U.S. PATENT DOCUMENTS

| | | | |
|---|---|---|---|
| 7,069,497 B1 * | 6/2006 | Desai | G06F 17/3089 707/E17.116 |
| 8,954,605 B1 * | 2/2015 | Hecht | H04L 51/18 709/206 |
| 9,225,729 B1 * | 12/2015 | Moen | G06F 21/577 |
| 2002/0194380 A1 * | 12/2002 | Sullivan | G06F 17/30076 709/246 |
| 2006/0089919 A1 * | 4/2006 | Kidd | G06Q 20/02 705/75 |
| 2008/0137857 A1 * | 6/2008 | Bellare | H04L 9/085 380/255 |
| 2008/0282079 A1 * | 11/2008 | Yaghmour | H04L 9/00 713/150 |

(Continued)

*Primary Examiner* — Don Zhao
(74) *Attorney, Agent, or Firm* — Frommer Lawrence & Haug LLP

(57) ABSTRACT

A computer implemented method for encrypting one or more files and wrapping them in an HTML document. The HTML document contains the encrypted files, the necessary code to decrypt the files, as well as user interface code to receive a passphrase input from a user. The HTML document can be opened using any modern web browser, to obtain the original files using the same passphrase with which the encryption was performed. This offers a convenient way of sharing encrypted files via email or cloud file sharing services using a platform independent file format (without having to install any additional software).

10 Claims, 2 Drawing Sheets

(56) References Cited

U.S. PATENT DOCUMENTS

| | | | | |
|---|---|---|---|---|
| 2009/0254803 | A1* | 10/2009 | Bayne | G06F 17/243 |
| | | | | 715/222 |
| 2010/0037050 | A1* | 2/2010 | Karul | H04L 63/0428 |
| | | | | 713/167 |
| 2010/0049978 | A1* | 2/2010 | Ogawa | H04L 12/58 |
| | | | | 713/170 |
| 2011/0258532 | A1* | 10/2011 | Ceze | G06F 17/30902 |
| | | | | 715/234 |
| 2012/0089481 | A1* | 4/2012 | Iozzia | G06F 21/31 |
| | | | | 705/26.41 |
| 2013/0326333 | A1* | 12/2013 | Hashmi | G06F 17/2247 |
| | | | | 715/234 |
| 2014/0169554 | A1* | 6/2014 | Scarisbrick | H04L 9/0863 |
| | | | | 380/28 |
| 2014/0208100 | A1* | 7/2014 | Kendall | H04L 9/0863 |
| | | | | 713/164 |

* cited by examiner

METHOD FOR GENERATING AN HTML DOCUMENT THAT CONTAINS ENCRYPTED FILES AND THE CODE NECESSARY FOR DECRYPTING THEM WHEN A VALID PASSPHRASE IS PROVIDED

FIELD OF THE INVENTION

The present invention relates to the field of communication systems. More specifically, the present invention relates to methods and systems for enhancing data privacy in communication systems.

BACKGROUND OF THE INVENTION

In the wake of recent revelations on privacy attacks, the protection of data using methods like encryption have gained paramount importance. Users can protect the privacy of their data very effectively by encrypting any file prior to sharing it with someone using unsecured means like email or cloud-based file sharing services. File encryption is commonly used for protecting the privacy of data contained in it. Unless the associated key is available, decrypting the file to obtain the original file requires substantial computation power and energy. With symmetric encryption, the same key is used for encryption as well as for decryption. Keys can be derived from a pass phrase using a key derivation function (KDF), for example PBKDF2 (Password-Based Key Derivation Function 2).

On the other hand, web browsers are today well known to anyone for retrieving content on Internet.

However, there is today no encryption scheme that allows to use a standard web browser for storing and encrypting data. Encryption and compression functionalities are usually implemented by dedicated software which are usually independent from web browsers and need to be installed for allowing such functionalities to be performed. In this sense, performing encryption and compression of data pieces usually remain cumbersome operations for standard users who do not possess particular computer skills.

SUMMARY OF THE INVENTION

A first goal of the present invention is to enhance privacy in communication systems by providing a method that allows to securely store data pieces in documents which can be interpreted in a web browser, in particular HTML documents.

A second goal of the invention is to enhance privacy in communication systems while providing platform independence to allow functionalities such as encryption, compression, storage, extraction, decryption and decompression of any given file or any given set of files to be performed using only any modern web browser, in particular with any computing device that executes an HTML or HTML5 compliant web browser.

A third goal of the invention is to provide a method for enhancing privacy in communication systems, in particular a method that allows to easily encrypt and decrypt data pieces, which can be used even by users that do not have any particular computer skills, in other terms a method that allow such functionalities to be implemented without requiring cumbersome operations to be performed.

A fourth goal of the invention is to provide a method that enhances data privacy in the context of email or cloud-based data sharing.

These goals are achieved with the methods according to the invention described below.

According to a first aspect of the invention, a method for storing one or more data pieces in a document which can be interpreted by a web browser is performed by a web browser and comprises the following steps:
  deriving a master key material from an encryption parameter using a key derivation function;
  generating one or more random key materials;
  encrypting said one or more data pieces with a symmetric encryption scheme, wherein each one of said one or more data pieces is encrypted using a distinct one of said one or more random key materials, so as to obtain one or more ciphertexts;
  assembling said one or more random key materials in a list;
  computing a verification hash from said list using a cryptographic hash function;
  encrypting said list with said master key material using said symmetric encryption scheme to obtain an encrypted list; and
  creating said document by including in it said verification hash, said encrypted list, said one or more ciphertexts and additional information which, when interpreted by a web browser, provides
    a user interface allowing a user to submit a decryption parameter,
    an implementation of said cryptographic hash function,
    an implementation of said key derivation function allowing to compute said master key on the basis of said decryption parameter and
    an implementation of a decryption algorithm for inverting said symmetric encryption scheme.

According to one feature, the method may further comprise a step of using a compression algorithm to compress said one or more pieces of data.

According to another feature, said encryption parameter and said decryption parameter may be selected from the group consisting of a password and a passphrase.

According to another feature, said one or more data pieces may stem from a single file.

According to another feature, said one or more data pieces may stem from a plurality of files.

According to another feature, said password or passphrase may be automatically generated.

According to another feature, the method may further comprise a step of storing said self-contained HTML document on a storage facility, wherein said storage facility is selected from the group consisting of a local hard drive, a mounted drive, a network attached store and a cloud storage service.

According to a second aspect of the invention, a method for extracting from a document which can be interpreted by a web browser one or more original data pieces is performed by a web browser and comprises the following steps:
  requesting submission of a decryption parameter;
  retrieving a key derivation function contained in said document;
  deriving a master key material from said decryption parameter using said key derivation function;
  retrieving an encrypted list contained in said document;
  retrieving a decryption algorithm contained in said document;
  decrypting said encrypted list using said master key material and said decryption algorithm, obtaining a decrypted list which contains one or more random key materials;

retrieving a hash function contained in said document;
computing a hash of said decrypted list using said hash function;
retrieving a verification hash contained in said document;
comparing said hash to said verification hash; and
if said verification hash and said hash are equivalent,
extracting one or more ciphertexts contained in said document and
decrypting said ciphertexts using said one or more random key materials and said decryption algorithm, so as to obtain said one or more original data pieces.

According to one feature, the method may further comprise a step of using a decompression algorithm, an implementation of which is contained in said HTML document, to decompress said ciphertexts.

According to one feature, said decryption parameter may be selected from the group consisting of a password and a passphrase.

BRIEF DESCRIPTION OF THE DRAWINGS

Other advantages and features of the invention will become more clearly apparent from the following description of the invention which refers to the accompanying drawings, in which.

DETAILED DESCRIPTION

The invention allows using a web browser to store one or more data pieces directly in a document which can be interpreted by a web browser. The methods according to the invention which are described below are preferably implemented using JavaScript and rely on functionalities provided by HTML5. As will be understood from the following description, the invention pertains to a method for storing data pieces in an HTML document and to the complementary method for extracting data pieces from an HTML document. Both methods are performed by a web browser executed by a computing device. In the sense of the invention, an HTML document is a single file which includes HTML tags and is saved with an ".html" extension.

Figure 1:
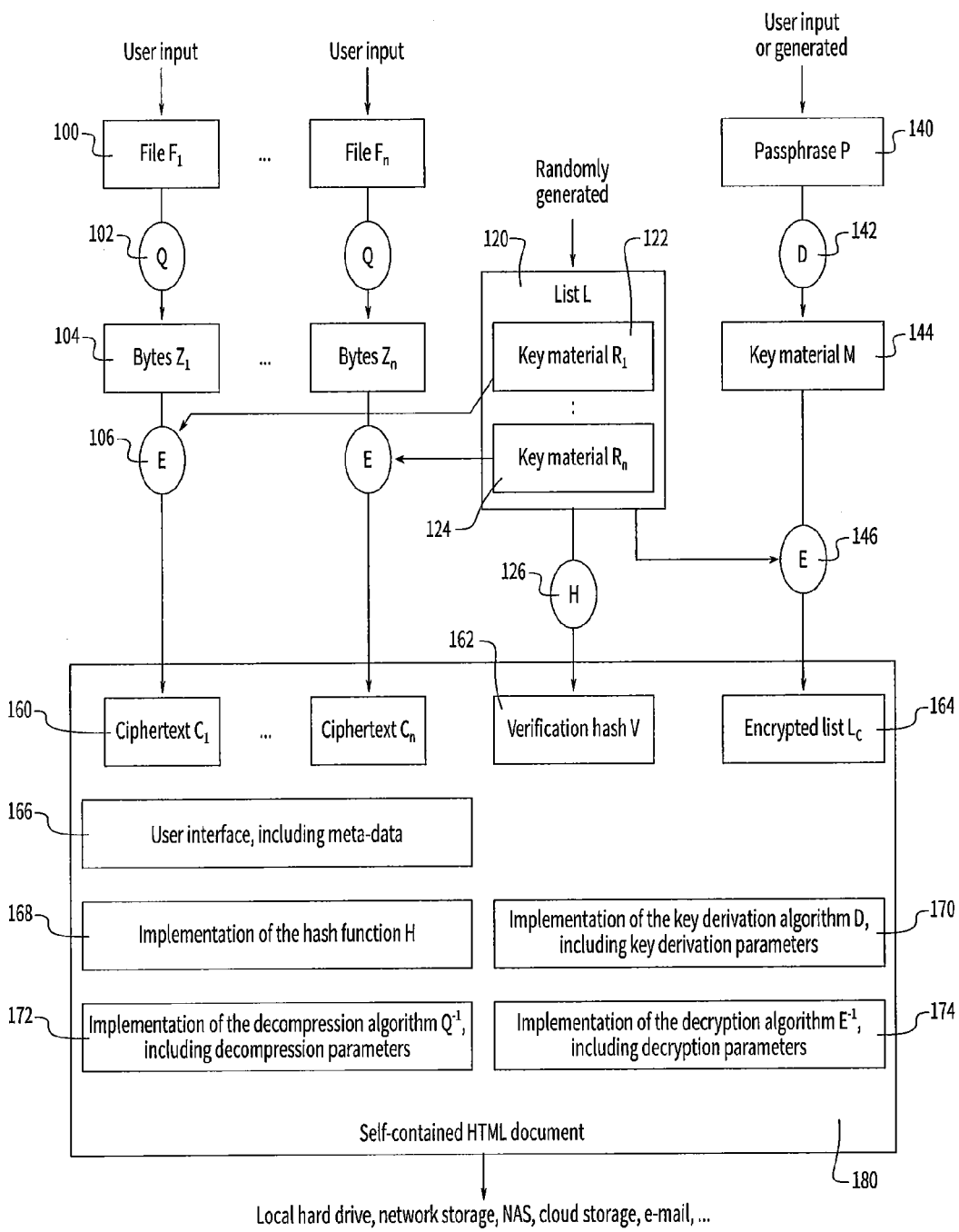
FIG. 1 schematically shows a method for storing data pieces according to invention.

FIG. 1 schematically shows the method for storing data pieces in a document which can be interpreted by a web browser according to a first aspect of the invention.

The method requires:
a cryptographic hash function (H),
a symmetric encryption scheme (E), optionally including a block cipher function and a padding function if necessary and
a key derivation function (D), deterministically producing the necessary key material for E given a password or passphrase.

Optionally, the method further requires a compression scheme (Q).

An example of an encryption scheme is AES (Advanced Encryption Standard) in cipher block chaining (CBC) mode with PKCS7 padding but any other encryption scheme can be used.

An example of a key derivation function is PBKDF2 with SHA256 (secure hash algorithm). Key material may include a block encryption key and an initialization vector. An example of a compression scheme is DEFLATE, which uses a combination of the LZ77 algorithm and Huffman coding.

In a first step 100, the user chooses one or more files $F_1, \ldots, F_n$, i.e. one or more data pieces and submits a password or passphrase P. Alternatively, the password or passphrase P is automatically generated. This first step 100 is the only step where user input is necessary whereas further steps described below are automatically performed by the web browser.

Then, in an optional step 102, each file $F_j$ is compressed using Q to obtain, in a step 104, compressed bytes $Z_j$.

Then, in another step 106, compressed bytes $Z_j$ are encrypted using E and one or more randomly generated key materials $R_j$, which are generated in a step 122, to obtain in another step 160 one or more ciphertexts $C_j$.

In another step 120, the randomly generated key materials for all files $R_1, \ldots, R_n$ are combined into a list L. Then, in another step 126, the cryptographic hash function H on the list L to obtain, in another step 162, a verification hash V.

In another step 142, a master key material M is derived using the key derivation function D.

In another step 146, the list L is encrypted using E and M to obtain in another step 164 an encrypted list $L_C$.

In a last step 180, a self-contained HTML document is created. The user may store this document on any storage device, or share it with friends through any communication channel or network.

One notes that according to the invention, the encryption of the files is separated from the passphrase by means of the list L, which contains the encryption key material M for each input file. The user-provided file or files can be encrypted without waiting for the passphrase input. This provides the advantage, that in the event the user changes the passphrase, only the list L needs to be re-encrypted, and not the whole file or set of files, thus saving time and energy. This speed advantage comes without any compromise on the security provided by the encryption scheme. That is to say, the security is equally resistant to malicious attacks whether an input file is re-encrypted with a newly generated key material each time the passphrase changes or only the key material generated the first time is re-encrypted each time the passphrase changes.

Further, it is to be noted that the input files can be compressed and encrypted in parallel, independently of each other.

The verification hash V allows for checking the password or passphrase. Upon decryption in accordance with the method described in relation with FIG. 2, if V does not match the hash of the decrypted list L, the password or passphrase is deemed wrong and the decryption process can be aborted before decrypting any of the ciphertexts.

The self-contained HTML document includes the following contents:
the ciphertexts $C_1, \ldots, C_n$, in any suitable encoding, for example such as base 64 encoding,
the verification hash V allowing to check if the passphrase is correct,
the encrypted list $L_C$ containing the random key material $R_1, \ldots, R_n$ in encrypted form,
an implementation of a user interface allowing a user to input a passphrase or password, optionally presenting meta data about the encrypted files, such as their names, file types, and file sizes, and optionally showing visual information for example a message, a picture, a password hint, or information about the author of the document,
an implementation of the cryptographic hash function H,
an implementation of the key derivation function D, with additional parameters, which optionally include a salt and a number of iterations, and additional functions, which optionally include a cryptographic hash function, necessary to deterministically derive the master key M from the passphrase or password P, an implementation of a decompression algorithm $Q^{-1}$, with all parameters necessary for decompression, an implementation of a decryption algorithm $E^{-1}$, which inverts E, with additional parameters, which may include an initialization vector (IV), and additional functions, which may include a padding function and a block cipher mode function such as cipher-block chaining (CBC), necessary for decryption.

Figure 2:
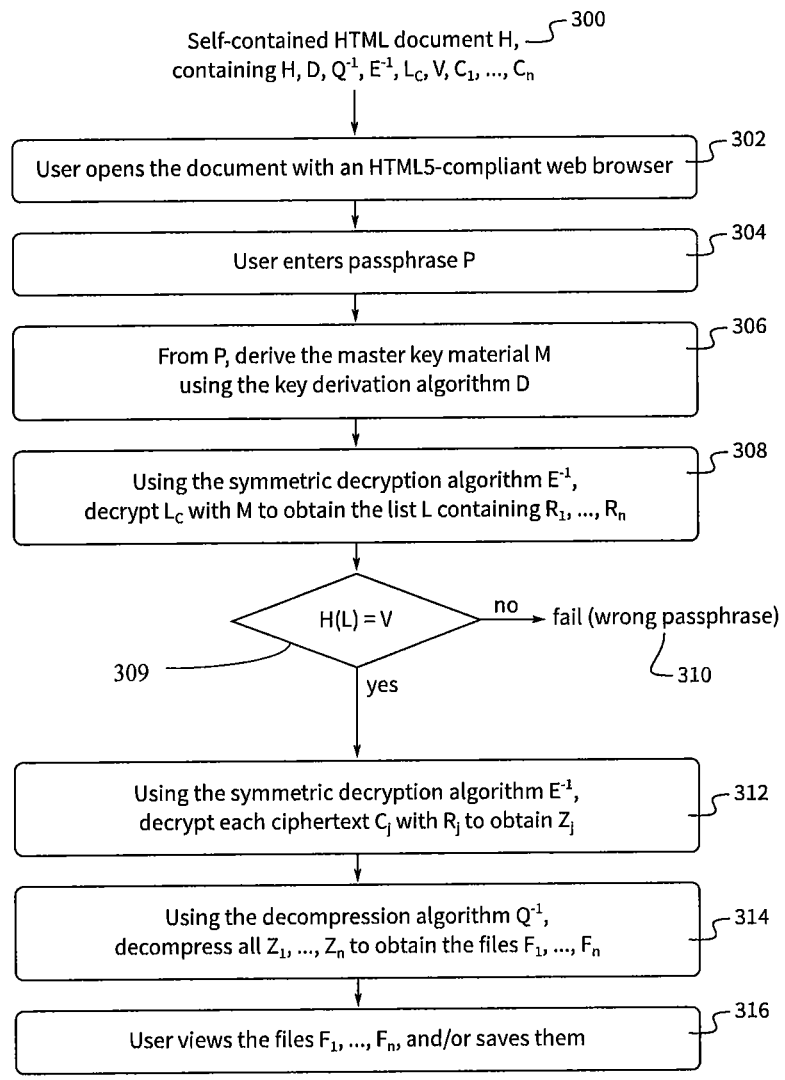
FIG. 2 schematically shows a method for extracting data pieces according to the invention.

FIG. 2 shows a method for extracting original data pieces from an HTML document according to a second aspect of the invention, when the HTML document has been created by implementing the steps of the method described in relation with FIG. 1. In other terms, FIG. 2 shows the complementary method to the method described in relation with FIG. 1, i.e. how the original data pieces can be recovered from the self-contained HTML document described above.

In a first step 302, the user first opens the self-contained HTML document with an web browser.

In another step 304, the user will be presented with an interface requiring submission of a passphrase or password P.

In another step 306, a master key material M is derived from P using the key derivation function contained in the HTML document.

In another step 308, the encrypted list $L_C$ is decrypted using the symmetric decryption algorithm $E^{-1}$ contained in the HTML document and the master key material M derived at step 306, so as to obtain the list L with the random key materials $R_1, \ldots, R_n$.

In another step 309, the cryptographic hash H of the decrypted list L is calculated and compared to the verification hash V. If these hashes differ, the provided passphrase is deemed incorrect, and the decryption process is aborted at step 310.

Otherwise, the decryption process proceeds with a step 312 of decrypting all ciphertexts $C_1, \ldots, C_n$ using the respective key materials $R_1, \ldots, R_n$, to obtain the byte sequences $Z_1, \ldots, Z_n$, which, in an optional step 314, are decompressed using $Q^{-1}$ to obtain the original files $F_1, \ldots, F_n$.

In another step 316, the user interface presents the files and allows the user to view or save them.

As it appears from the description, the invention provides an improvement in the field of communication systems by enhancing data privacy and by providing methods which allow:

to securely store data pieces in documents which can be interpreted in a web browser, in particular HTML documents, functionalities such as encryption, compression, storage, extraction, decryption and decompression of any given file or any given set of files to be performed using only any modern web browser and to easily encrypt and decrypt data pieces, even for users that do not have any particular computer skills.

What is claimed is:

1. A method for storing one or more data pieces in a document which can be interpreted by a web browser, wherein said method is performed by a web browser and comprises steps of:

deriving a master key material from an encryption parameter using a key derivation function;

generating one or more random key materials;

encrypting said one or more data pieces with a symmetric encryption scheme, wherein each one of said one or more data pieces is encrypted using a distinct one of said one or more random key materials, so as to obtain one or more ciphertexts;

assembling said one or more random key materials in a list;

computing a verification hash from said list using a cryptographic hash function;

encrypting said list with said master key material using said symmetric encryption scheme to obtain an encrypted list; and creating said document by including in the document said verification hash, said encrypted list, said one or more ciphertexts and additional information which, when interpreted by a web browser, provides a user interface allowing a user to submit a decryption parameter, an implementation of said cryptographic hash function, an implementation of said key derivation function allowing to compute said master key on the basis of said decryption parameter, and an implementation of a decryption algorithm for inverting said symmetric encryption scheme.

2. The method of claim 1, further comprising a step of using a compression algorithm to compress said one or more pieces of data.

3. The method of claim 1, wherein said encryption parameter and said decryption parameter are selected from the group consisting of a password and a passphrase.

4. The method of claim 1, wherein said one or more data pieces stem from a single file.

5. The method of claim 1, wherein said one or more data pieces stem from a plurality of files.

6. The method of claim 1, wherein said password or passphrase is automatically generated.

7. The method of claim 1, further comprising a step of storing said document on a storage facility, wherein said storage facility is selected from the group consisting of a local hard drive, a mounted drive, a network attached store and a cloud storage service, wherein said document is a self-contained HTML document.

8. A method for extracting from a document which can be interpreted by a web browser one or more original data pieces, wherein said method is performed by a web browser and comprises steps of:

requesting submission of a decryption parameter;

retrieving a key derivation function contained in said document;

deriving a master key material from said decryption parameter using said key derivation function;

retrieving an encrypted list contained in said document;

retrieving a decryption algorithm contained in said document;

decrypting said encrypted list using said master key material and said decryption algorithm, obtaining a decrypted list which contains one or more random key materials;

retrieving a hash function contained in said document;

computing a hash of said decrypted list using said hash function;

retrieving a verification hash contained in said document;

comparing said hash to said verification hash; and if said verification hash and said hash are equivalent, extracting one or more ciphertexts contained in said document and decrypting said ciphertexts using said one or more random key materials and said decryption algorithm, so as to obtain said one or more original data pieces.

9. The method of claim 8, further comprising a step of using a decompression algorithm, an implementation of which is contained in said document, to decompress said ciphertexts, wherein said document is an HTML document.

10. The method of claim 8, wherein said decryption parameter is selected from the group consisting of a password and a passphrase.

* * * * *